H. C. BREMER.
AUTOMATIC MUD RIM FOR AUTOMOBILES.
APPLICATION FILED OCT. 14, 1913.
1,145,667.
Patented July 6, 1915.
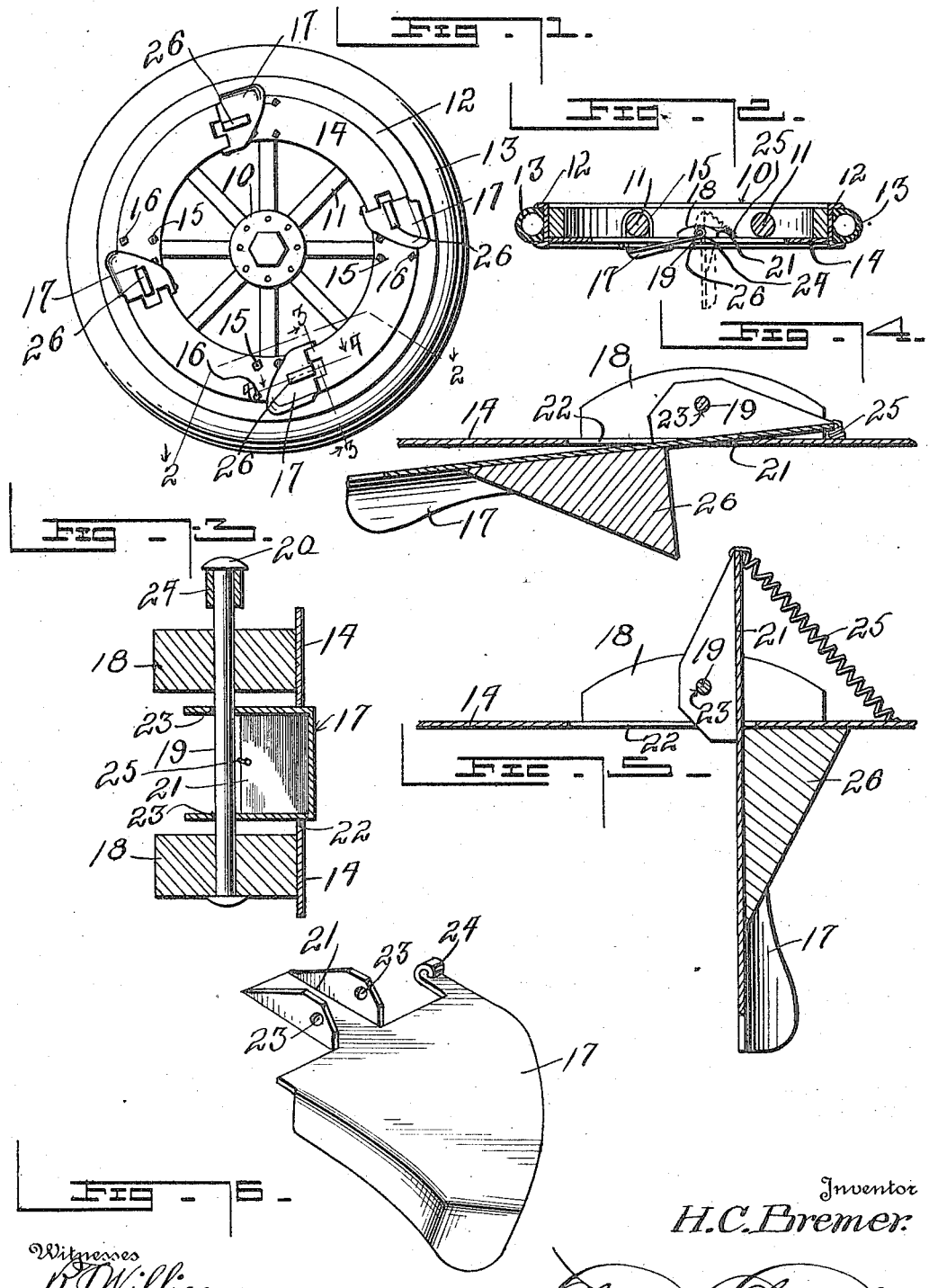

UNITED STATES PATENT OFFICE.

HERMAN C. BREMER, OF FLORENCE, MISSOURI.

AUTOMATIC MUD-RIM FOR AUTOMOBILES.

1,145,667.

Specification of Letters Patent.

Patented July 6, 1915.

Application filed October 14, 1913. Serial No. 795,106.

*To all whom it may concern:*

Be it known that I, HERMAN C. BREMER, a citizen of the United States, residing at Florence, in the county of Morgan, State of Missouri, have invented certain new and useful Improvements in Automatic Mud-Rims for Automobiles; and I do hereby declare the following to be a full, clear, and exact description of the invention, such as will enable others skilled in the art to which it appertains to make and use the same.

This invention relates to automatic mud rims for automobiles and has for an object to provide means in the nature of hinged blades on the driving wheels of an automobile, such blades being arranged to automatically swing outward and provide traction grips that will assist the automobile in pulling out of the mud or such other places as heavy sand and the like where the wheels cannot get a grip upon the ground.

With the above object in view the invention consists of certain novel details of construction and combination of parts hereinafter full described and claimed, it being understood that various modifications may be made in the minor details of construction within the scope of the appended claim.

In the accompanying drawing illustrating this invention:—Figure 1 is a side elevation of a wheel showing the application of my invention. Fig. 2 is a cross sectional view on the line 2—2 Fig. 1 showing the blade in full lines in closed position and in dotted lines in open position. Fig. 3 is a detail sectional view on the line 3—3 Fig. 1 showing the manner of pivoting the blade on the supplemental rim. Fig. 4 is a similar view taken on the line 4—4 Fig. 1. Fig. 5 is a view similar to Fig. 4 but showing the blade rocked outwardly to its limit of movement. Fig. 6 is a detail perspective view of the blade detached.

Referring now to the drawing in which like characters of reference designate similar parts, 10 designates an automobile wheel having the usual spokes 11, rim 12, and tire 13.

The traction device which forms the subject-matter of my invention comprises an annulus 14 which is arranged on one side of the wheel rim, and is secured to the spokes by bolts 15 and 16 or otherwise, the annulus being of such width as to extend over a portion of the tire. At intervals along this annulus are disposed paddle-shaped pivotal blades 17, in the present embodiment of the invention, four of such blades being shown, although any desired number of such blades may be used.

To secure each blade a pair of hinge lugs 18 are fixed to the inner face of the annulus and through these lugs a pivot pin 19 is passed and extends radially as shown, the upper end of the pin or that end most remote from the tire being extended slightly above the adjacent hinge lug as shown at 20.

Each paddle-shaped blade 17 is formed centrally on the inner edge with a hinge lug 21 that passes through a slot 22 in the annulus and is formed intermediate the ends with openings 23 to receive the pintle, the blade being further provided on said edge with a hinge lug 24 which engages the projecting end 20 of the pintle. A helical spring 25 is secured to the free end of the blade hinge lug 21 and to the annulus, this spring serving to normally hold the paddle-shaped blade rocked on its hinge to lie substantially flat against the annulus and extending along the latter in a direction identical with the direction of rotation of the wheel.

Fixed on the outer face of the paddle-shaped blade is a substantially triangular shaped stop 26 the purpose of which is to limit swinging out of the blade against the tension of its controlling spring. When the machine encounters mud or sand, the wheels will naturally sink into this roadbed whereupon as each paddle wheel is carried down on the front side of the wheel it will impinge with its open end into the mud or sand and will be opened that is, swung outwardly on its pivot by the pressure of the mud or sand until the stop 26 contacts with the annulus and prevents swinging out of the blade to more than a right angle to the face of the annulus. Owing to the rigid connection of the annulus with the spokes of the wheel there will be sufficient traction set up as the blade opens to insure the uninterrupted advance of the machine.

From the above description it will be seen that I have provided an extremely simple and effective traction device for assisting an automobile to pass through heavy roadbeds, such device being formed of a few strong and durable parts that will not easily get out of order.

What is claimed is:—

A traction grip for vehicle wheels, including a stationary member attachable to a wheel, a blade hinged to said member to normally lie against and extend in the direction of rotation of the wheel, and to be automatically swung laterally at right angles from the latter by contact with the soil, means for yieldably holding the blade in its normal position, and means for limiting swinging movement of the blade.

In testimony whereof, I affix my signature, in the presence of two witnesses.

HERMAN C. BREMER.

Witneses:
C. A. SELKEN,
C. P. KAHES.

Copies of this patent may be obtained for five cents each, by addressing the "Commissioner of Patents, Washington, D. C."